Figure 1:
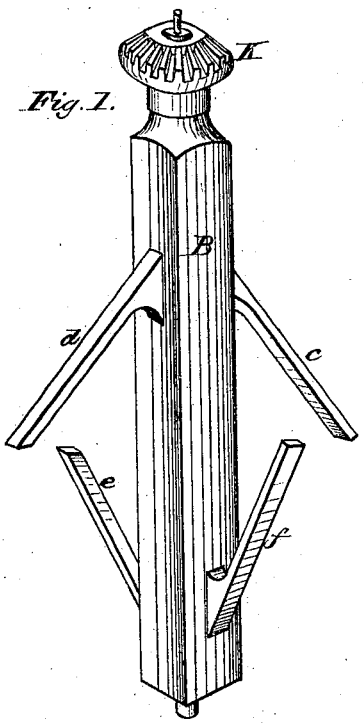
Figure 2:
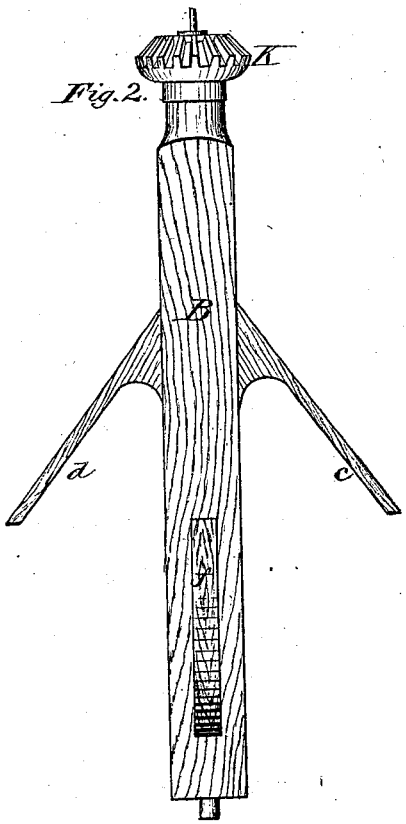
Figure 3:
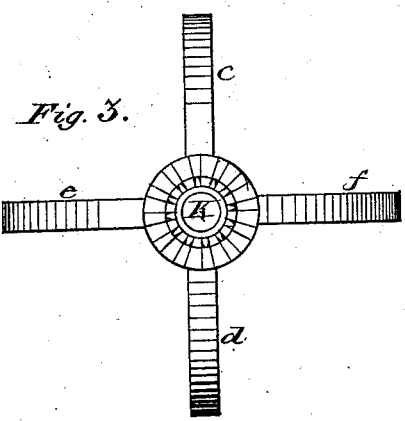

J. B. Mellor,

Churn Dasher.

No. 110,487. Patented Dec. 27, 1870.

Witnesses:
F. C. Brecht.

Inventor:
James B. Mellor
pr Atty Otto Leissring.

United States Patent Office.

JAMES B. MELLOR, OF NEW HOPE, MISSOURI.

Letters Patent No. 110,487, dated December 27, 1870.

IMPROVEMENT IN CHURN-DASHERS.

The Schedule referred to in these Letters Patent and making part of the same.

*To all whom it may concern:*

Be it known that I, JAMES B. MELLOR, of New Hope, Lincoln county, State of Missouri, have invented a new and useful Improvement in Churn-Dashers; and I do hereby declare the following to be a full and exact description of the same.

The drawing represents a perspective view of my churn-dasher, with the common churn A.

H is a large beveled wheel with its shaft and crank, and meshes into the small beveled wheel K, made fast to the end of the shaft B, by means of which the shaft B is caused to revolve in an upright position in the churn in the ordinary way.

Of course I do not claim these as new in any particular, for they have long ere this been anticipated by others; but the following I do claim to be new.

$d$ and $c$ are two arms, made fast to the shaft B on opposite sides, and inclining downward at an angle of about forty-five degrees, so that when the shaft B is caused to revolve the arms $d$ and $c$ will give the cream a downward motion.

$e$ and $f$ are two like arms, made fast to the shaft B on opposite sides to each other, and opposite the arms $d$ and $c$, and inclining upward at an angle of about forty-five degrees, and situated below the arms $d$ and $c$ far enough, so that their upper ends will come in the same plane with the lower ends of the arms $d$ and $c$; $e$ and $f$ being thus constructed on the shaft B when it revolves will give an upward motion to the cream at the same time that the arms $d$ and $c$ give the downward motion to it, thus producing counter currents, which will tend to break the globules of the cream more effectually than any other method.

This dasher is superior to any other from the fact that it not only produces counter currents, but also throws the cream up and down by means of the arms, thus throwing the top of the cream to the bottom and the bottom to the top, by means of which the cream is effectually aired while it is being churned, which it so much needs to avoid heating.

I am aware of the churn-dasher patented to S. G. Shanks, July 12, 1870, but this I do not claim, as it differs from mine both in form and function, though bearing a superficial resemblance thereto; but

What I claim, and desire to secure by Letters Patent, is—

The improved churn-dasher above described and specified, consisting of the vertical revolving shaft B, having the arms $d$ and $c$ projecting from opposite sides downward at an angle of forty-five degrees, and the arms $e$ and $f$ projecting upward from the alternate sides at the same angle, said arms so arranged that the external ends respectively shall lie in the same horizontal plane.

JAMES B. MELLOR.

Witnesses:
 WM. E. ALTHOUSE,
 WM. F. SMITH.